(12) United States Patent
Schmidt

(10) Patent No.: US 10,759,523 B2
(45) Date of Patent: Sep. 1, 2020

(54) AIRCRAFT ASSEMBLY AND METHOD

(71) Applicant: Safran Landing Systems UK LTD, Gloucester (GB)

(72) Inventor: Robert Kyle Schmidt, Gloucester (GB)

(73) Assignee: Safran Landing Systems UK LTD (GB)

( * ) Notice: Subject to any disclaimer, the term of this patent is extended or adjusted under 35 U.S.C. 154(b) by 374 days.

(21) Appl. No.: 15/834,873

(22) Filed: Dec. 7, 2017

(65) Prior Publication Data
US 2018/0170529 A1    Jun. 21, 2018

(30) Foreign Application Priority Data

Dec. 21, 2016    (EP) .................................... 16205634

(51) Int. Cl.
*B64C 25/28*    (2006.01)
*B64D 45/00*    (2006.01)
*B64C 13/16*    (2006.01)
*B64D 45/04*    (2006.01)
*B64C 25/26*    (2006.01)
(Continued)

(52) U.S. Cl.
CPC ............. *B64C 25/28* (2013.01); *B64C 13/16* (2013.01); *B64C 25/26* (2013.01); *B64D 45/0005* (2013.01); *B64D 45/04* (2013.01); *B64C 2025/003* (2013.01); *G05D 1/0676* (2013.01)

(58) Field of Classification Search
CPC ........ B64C 25/28; B64C 13/16; B64C 25/26; B64C 2025/003; B64D 45/0005; B64D 45/04; G05D 1/0676
See application file for complete search history.

(56) References Cited

U.S. PATENT DOCUMENTS

| | | | |
|---|---|---|---|
| 4,516,124 A * | 5/1985 | Shannon | B64C 25/001 244/101 |
| 5,745,053 A | 4/1998 | Fleming | |
| 10,202,204 B1 * | 2/2019 | Daidzic | B64C 5/02 |

(Continued)

FOREIGN PATENT DOCUMENTS

FR    945402 A    5/1949

OTHER PUBLICATIONS

Extended European Search Report for European Application No. 16205634.5-1754, dated Jun. 12, 2017—6 Pages.

*Primary Examiner* — Sze-Hon Kong
(74) *Attorney, Agent, or Firm* — RatnerPrestia

(57) ABSTRACT

An aircraft assembly having landing gear with a known deployment value, apparatus for permitting landing gear deployment, down-lock sensing apparatus, a navigation system, a landing gear control system, a flight control system, and a deployment controller. The deployment controller is configured to: calculate a touch down value using the aircraft position and speed information provided by the aircraft navigation system; command the landing gear control system to provide the deploy signal when the touch down value reaches a deployment threshold value which is greater than the landing gear deployment value; and command the flight control system to execute a landing abort sequence if the controller does not receive the down-lock signal from the landing gear sensing apparatus within a deployment value window which is greater than or equal to the known deployment value for the landing gear but less than the touch down value.

12 Claims, 6 Drawing Sheets

(51) Int. Cl.
*G05D 1/06* (2006.01)
*B64C 25/00* (2006.01)

(56) References Cited

U.S. PATENT DOCUMENTS

| | | | |
|---|---|---|---|
| 2003/0011493 A1* | 1/2003 | Wiplinger | B64C 25/28 340/960 |
| 2011/0066307 A1* | 3/2011 | Hiebl | G05D 1/0684 701/16 |
| 2011/0208400 A1* | 8/2011 | Lickfold | F02C 9/32 701/100 |
| 2013/0138274 A1* | 5/2013 | Caldeira | G05D 1/0676 701/16 |
| 2015/0122945 A1 | 5/2015 | Kavounas | |
| 2016/0272305 A1* | 9/2016 | Schmidt | B64C 25/10 |
| 2016/0318601 A1* | 11/2016 | Arnold | B64C 9/12 |
| 2017/0057623 A1* | 3/2017 | Schmidt | B64C 25/12 |
| 2017/0358226 A1* | 12/2017 | Hodges | G05D 1/0061 |

\* cited by examiner

AIRCRAFT ASSEMBLY AND METHOD

This application claims the benefit of and priority to European Application EP 16205634.5, filed on Dec. 21, 2016, the contents of which are incorporated herein by reference.

BACKGROUND OF THE INVENTION

An aircraft can generate considerable noise during a landing approach. A significant portion of this noise can be attributable to air flowing around the deployed landing gear. Although the aircraft may be travelling at around 80 m/s during the landing approach, the localised airflow around a noise-inducing component or region of the landing gear may reach speeds of around 300 m/s, which can result in considerable noise. This type of noise can be referred to as aero-acoustic noise. Aero-acoustic noise is particularly undesirable because of the fact that airports are often located close to cities, or other densely populated areas.

SUMMARY OF THE INVENTION

According to a first aspect of the present invention, there is provided an aircraft assembly having:
- one or more landing gear each arranged to be movable between a stowed condition for flight and a deployed condition for take-off and landing, the landing gear having a known deployment value;
- landing gear deployment apparatus for permitting the landing gear to move from the stowed condition to the deployed condition;
- landing gear down-lock sensing apparatus for detecting that the landing gear has assumed the deployed condition and providing a down-lock signal indicative of the landing gear having assumed the deployed condition;
- an aircraft navigation system for providing aircraft position relative to a target runway and aircraft speed information;
- an aircraft landing gear control system for providing a deploy signal to the landing gear deployment apparatus to deploy the landing gear and receiving the down lock signals from the landing gear sensing apparatus;
- an aircraft flight control system; and
- a landing gear deployment controller communicatively coupled to the aircraft navigation system, the aircraft landing gear control system and the aircraft flight control system, the landing gear deployment controller being configured to:
  - calculate a touch down value using the aircraft position and speed information provided by the aircraft navigation system;
  - command the aircraft landing gear control system to provide the deploy signal when the touch down value reaches a deployment threshold which is greater than the landing gear deployment value; and
  - command the aircraft flight control system to execute a landing abort sequence if the controller does not receive the down-lock signal from the landing gear sensing apparatus before expiry of a down-lock value which is greater than or equal to the deployment value for the landing gear but less than the touch down value.

Thus, the aircraft assembly according to the first aspect includes an automatic landing gear deployment controller that can automatically deploy the landing gear as late as possible before touchdown, therefore keeping the aircraft in a low noise generation state i.e. a relatively clean airframe and low engine power, until the aircraft is near the airport for deployment of the landing gear. The automatic landing gear deployment controller can deploy the landing gear more precisely and reliably in comparison to a human pilot, enabling the gear to be deployed later. This is in part due to the automatic landing gear deployment controller being configured to automatically signal the flight control system to execute a landing abort sequence in the event that any one of the gear does not lock in the deployed condition within its deployment time frame.

One optional feature of the aircraft assembly is the landing gear deployment controller being communicatively coupled to an aircraft flight deck interface system for enabling the landing gear deployment controller to be controlled from the aircraft flight deck.

Another optional feature of the aircraft assembly is the deployment threshold value being less than or equal to ten times the known deployment time for the landing gear.

Another optional feature of the aircraft assembly is the controller being configured to output commands to the flight control system to adjust the aircraft trim during the landing gear deployment using a pre-computed adjustment routine established based on system behavior. This can enable the gear to be deployed very late, when the aircraft is close to the ground, without deployment adversely affecting the stability of the aircraft during landing.

Another optional feature of the aircraft assembly is that the known deployment value for the landing gear may be a deployment time, the touch down value may be a touch down time, the deployment threshold value may be a deployment threshold time and the down-lock value may be a down-lock time.

In still another optional embodiment, the landing gear can be configured to be routinely deployed by gravity, which can increase the speed of deployment and thus enable the landing gear to be deployed later in the landing approach, which in turn can decrease the duration of aero-acoustic noise generated during a landing approach. The retraction linkage can be switched from the locking state to the extensible state, allowing the first and second joints to move towards or away from one another along the linkage axis such that the main strut falls by way of gravity towards the deployed condition. Before assuming the deployed condition, the damping device slows the main strut to reduce impact loads as the strut becomes fully deployed. The main strut can be locked in the deployed condition by one or more conventional stay and lock link mechanisms. Following take off, the retraction actuator can use the retraction linkage, which remains mechanically coupled to the main strut and retraction actuator throughout gravity deployment by way of the first and second joints, to retract the landing gear by reengaging the locking device to fix the degree of separation between the first and second joints. Moreover, since the retraction linkage permits relative movement between the first joint and the second joint independently of the extension state of the retraction actuator, the landing gear can be fully deployed even in the event that the retraction actuator jams in a fully or partially retracted extension state.

According to a second aspect of the present invention, there is provided a method of automatically deploying a landing gear from an aircraft. The method includes: calculating a touch down value indicative of the value until the aircraft touches down a runway using aircraft position and speed information provided by the aircraft navigation system; automatically deploying the landing gear when the touch down value reaches a deployment threshold value which is greater than a landing gear deployment value; and commanding a flight control system of the aircraft to execute a landing abort sequence if a landing gear down-lock signal is not received within a down-lock value which is greater than or equal to the known deployment value for the landing gear but less than the touch down value.

The foregoing aspect may also include a step of adjusting the aircraft trim during landing gear deployment using a pre-computed adjustment routine established based on system behaviour.

The deployment threshold value may be less than or equal to ten times the known deployment value for the landing gear.

The known deployment value for the landing gear may be a deployment time, the touch down value may be a touch down time, the deployment threshold value may be a deployment threshold time and the down-lock value may be a down-lock time.

These and other aspects of the present invention will become apparent from, and clarified with reference to, the embodiments described herein.

BRIEF DESCRIPTION OF THE DRAWINGS

Embodiments of the invention will now be described, by way of example only, with reference to the accompanying drawings, in which.

SPECIFICATION DESCRIPTION OF EMBODIMENTS OF THE INVENTION

Figure 1:
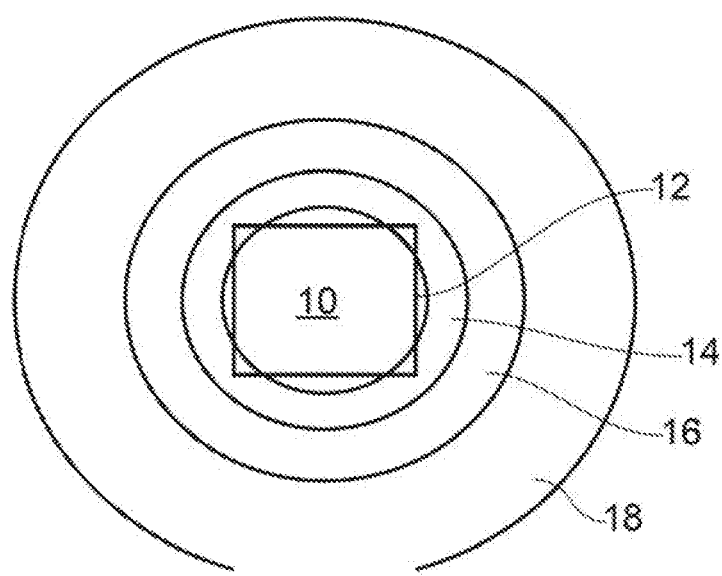
FIG. 1 is a diagram illustrating aircraft noise footprint.

Referring to FIG. 1, an aircraft noise footprint can be considered as a geographical space surrounding an airport 10. Concentric circles define zones 12-18 of noise acceptability. A high level of noise may be accepted in zone 12, which is closest to the airport 10. The level of noise that is acceptable in the next zone out 14 can be less than the acceptable noise level in zone 12. Likewise, the level of noise that is acceptable in zone 16 may be less than that of zone 14, and so on for zone 18.

Figure 2:
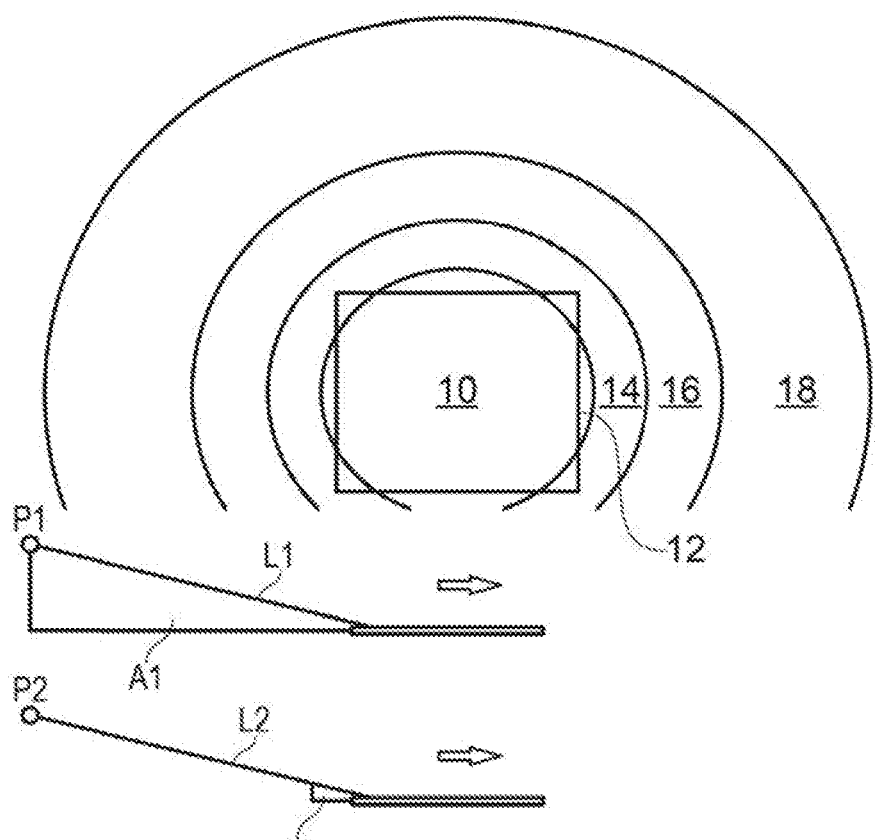
FIG. 2 is a diagram illustrating the noise footprint of two aircraft.

Referring to FIG. 2, in a conventional aircraft landing approach it is common for the landing gear to be deployed long before touchdown; for example, in the case of a large civil airliner, it is common for the landing gear to be deployed around 10 miles away from the runway. The angled lines L1, L2 represent a conventional aircraft glideslope path for planes P1, P2. The triangular areas A1, A2 under the lines L1, L2 represent the phase in which the landing gear are extended and the aircraft are generating more noise than in the relatively 'clean' gear-up condition.

A1 represents the standard situation in which the landing gear of plane P1 are deployed long before touchdown. The base of the triangle A1 extends from the airport and through zones 12 to 18. Thus, residents in the outer zones such as 16 and 18 are likely to perceive aero-acoustic noise from the landing gear of plane P1.

In contrast, aircraft assemblies P2 according to embodiments of the invention are arranged to reduce the noise level in outer zones, such as zones 16 and 18, by not extending the landing gear until the aircraft is close to the airport 10. As illustrated by line A2, the base of the landing gear deployment triangle for P2 extends from the airport 10 through zone 12 but ends in zone 14. Thus, the landing gear of plane P2 are deployed in zone 14.

Figure 3:
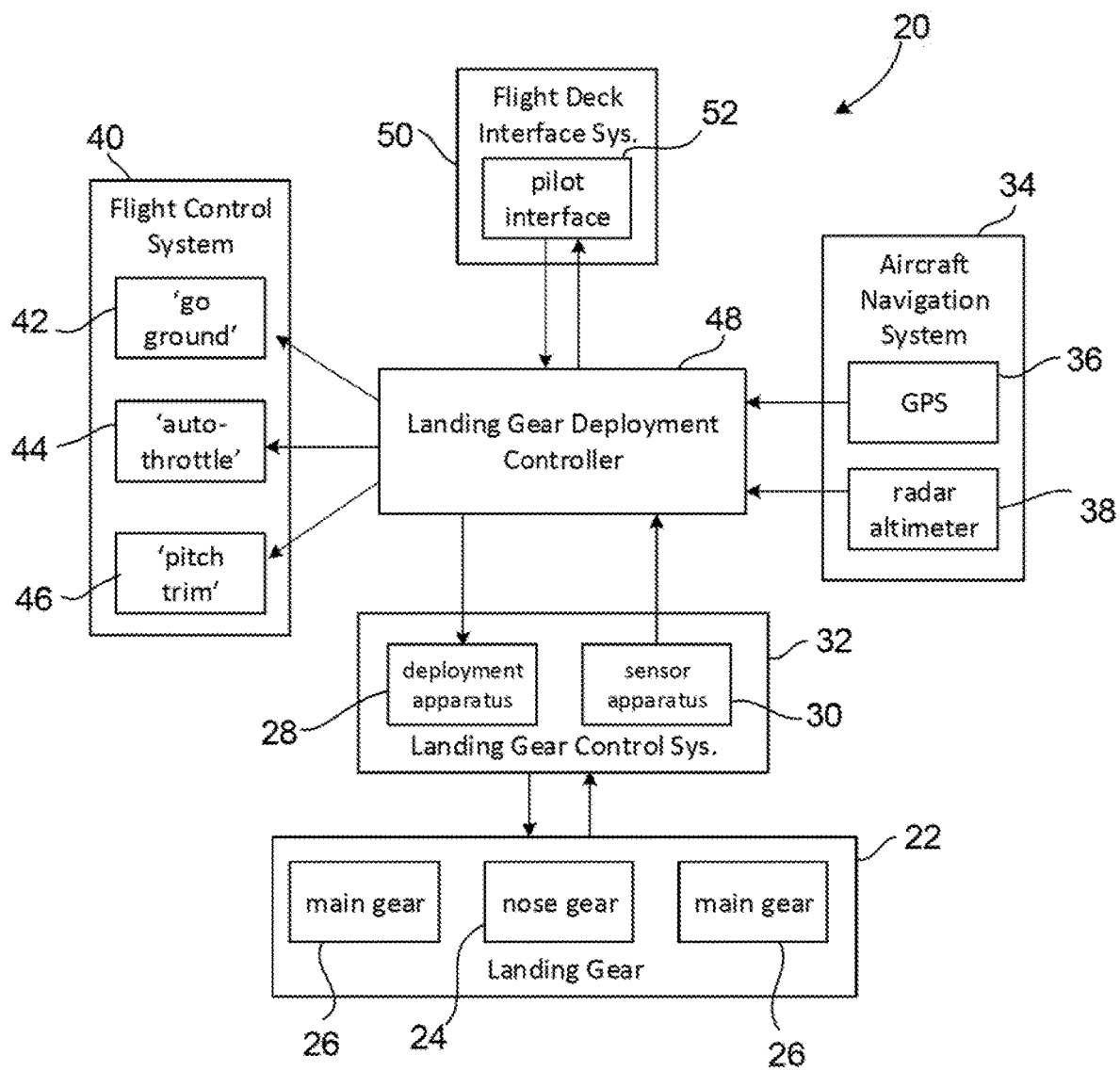
FIG. 3 is a system diagram of an aircraft assembly according to an embodiment of the invention including an automatic landing gear deployment controller.

FIG. 3 is a system diagram of an aircraft assembly 20 according to an embodiment of the invention. The aircraft assembly 20 comprises conventional 'auto-land' functionality and therefore a landing can take place under computer control.

The aircraft assembly 20 includes landing gear 22, which in this embodiment consists of a nose gear 24 and two main landing gear 26. Each landing gear is arranged to be moved between a stowed condition for flight and a deployed condition for take-off and landing in a known manner.

Each landing gear 24, 26 has a known deployment time. This can for example be measured by timing the gear during one or more deployment cycles.

The assembly 20 also includes conventional landing gear deployment apparatus 28 for permitting the landing gear to move from the stowed condition to the deployed condition. This can for example be a remotely operable 'up-lock' that releases the gear for gravity or actuator deployment.

The assembly 20 also includes conventional landing gear down-lock sensing apparatus 30 for detecting that the landing gear 22 has assumed the deployed condition. The sensing apparatus 30 outputs a down lock signal, which is indicative of the landing gear having assumed the deployed condition.

The landing gear deployment apparatus 28 and landing gear sensing apparatus 30 together form part of a landing gear control system 32. Upon receipt of a deploy signal, the landing gear control system 32 causes the landing gear deployment apparatus 28 to deploy the landing gear. The landing gear control system 32 also receives the down lock signals from the landing gear sensing apparatus 30. In a conventional aircraft, the landing gear control system 32 would receive the deploy signal from, and provide the down lock signals to, the flight deck.

The assembly 20 also includes a conventional aircraft navigation system 34 for providing aircraft position relative to a target runway and aircraft speed information. The aircraft navigation system 34 can provide geo-position information from GPS 36, inertial navigation, or other means. It can also comprise a radar altimeter 38.

The assembly 20 also includes a conventional aircraft flight control system 40 having automatic flight operations such as 'go-around' 42, 'auto-throttle' 44 and 'pitch trim' 46. A person skilled in the art will be familiar with such autopilot functions and for brevity they will not be described in further detail.

An aircraft assembly according to embodiments of the invention differs from known aircraft assemblies in that it includes a landing gear deployment controller 48 communicatively coupled to the aircraft navigation system 34, the aircraft landing gear control system 32 and the aircraft flight control system 40. The landing gear deployment controller 48 is a computing device configured to operate a control program. It can be implemented as a single computing device or a distributed computing device.

The landing gear deployment controller 48 can also be communicatively coupled to a flight deck interface system 50 comprising a pilot interface 52 that can be used by the pilot to activate and deactivate the landing gear deployment controller 48.

Figure 4:
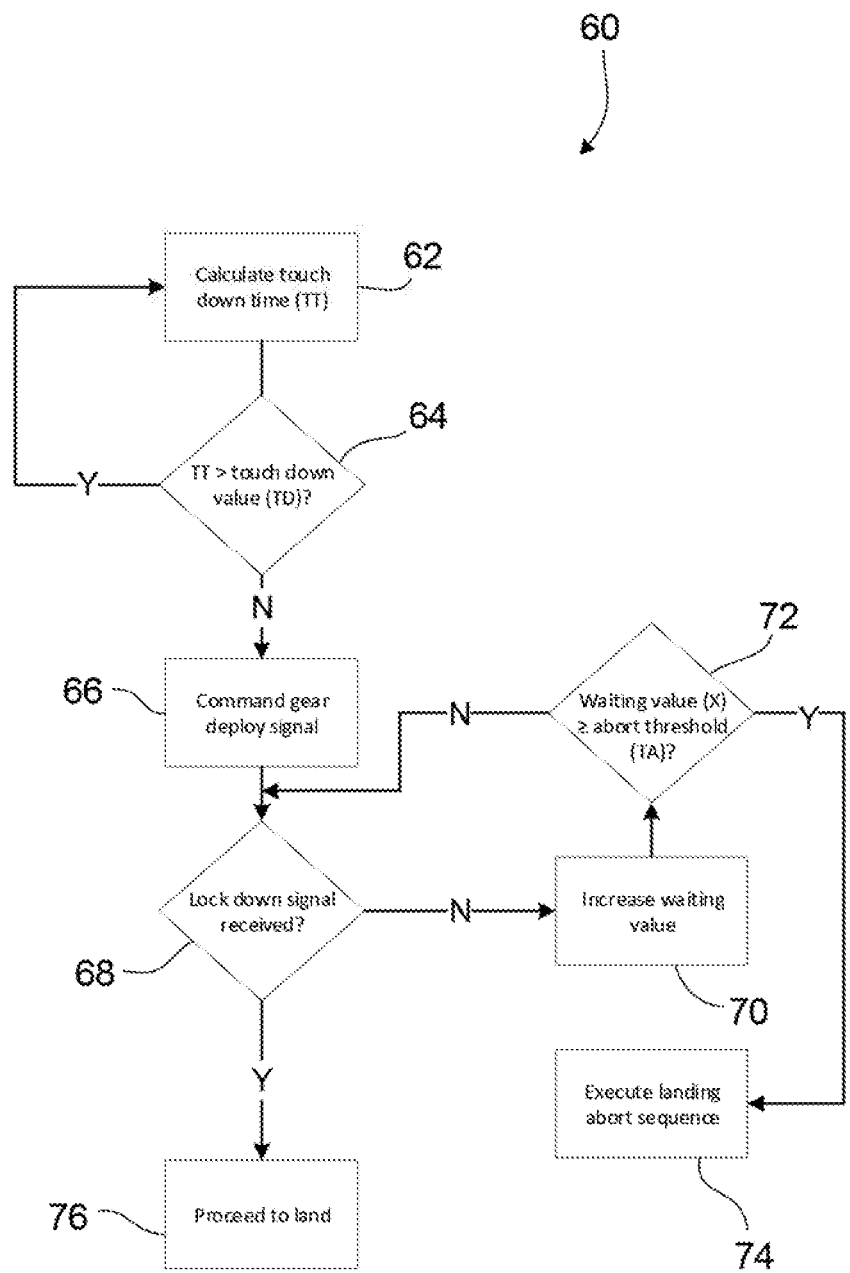
FIG. 4 is flow chart of a control algorithm performed by the automatic landing gear deployment controller of FIG. 3.

Referring additionally to FIG. 4, the control program of one embodiment is illustrated generally at 60.

The pilot can select an 'automatic gear down' option on the flight deck and ensure the active runway is input into the flight management system (FMS) or directly into the pilot interface 52 for the automatic landing gear deployment controller 48. With 'automatic gear down', the automatic landing gear deployment controller 48 is active.

At step 62 the landing gear deployment controller 48 is configured to calculate a touch down value. Given that aircraft speed is known, the various values described herein can be distance or time values. In this embodiment the landing gear deployment controller 48 is configured to calculate a touch down time TT using the aircraft position and speed information provided by the aircraft navigation system 34. The controller 48 can receive geo-position information from the navigation system 34. Based on the aircraft geo-position, the selected active runway from the FMS or from the data input into the controller, the controller can calculate the distance remaining to the runway. The FMS can automatically generate this information, in which case it can be taken directly from the navigation system. Alternatively, the distance can be calculated using distance measuring equipment slant range to a navigational beacon, or the controller can alternatively perform a database lookup of the geographical position of the runway threshold and calculate the distance remaining. Thus, knowing the speed of the aircraft and the distance between the aircraft and the runway, the landing gear deployment controller 48 can estimate a time duration before touch down.

At step 64 the landing gear deployment controller 48 is configured to determine whether the touch down time TT is greater than a deployment threshold TD, which like the touch down threshold can be a time or distance. In this embodiment the deployment threshold TD is a time value which is greater than or equal to the landing gear deployment time. The controller can for example determine the landing gear deployment threshold TD based on a database lookup of pre-determined thresholds. Alternatively, it can compute the deployment threshold TD based on the known time for landing gear deployment and the ground speed retrieved from the navigation system, or the deployment threshold TD can be calculated from successive geo-position updates.

If the touch down time TT is greater than the deployment threshold TD, the method returns to step 62.

If not, at step 66 the landing gear deployment controller 48 is configured to command the aircraft landing gear control system 32 to provide the gear deploy signal in order to automatically deploy the landing gear.

At step 68 the landing gear deployment controller 48 determines whether it has received the down lock signal from the landing gear sensing apparatus 30.

If so, the method ends at step 76 and the aircraft can proceed to land.

If not, a waiting value x is increased, for example by one, and the method proceeds to step 72.

At step 72 the landing gear deployment controller 48 determines whether the waiting value x is greater than or equal to an abort threshold TA. The abort threshold TA is a time value which is greater than or equal to the landing gear deployment time but less than the touch down time IT.

If not, the method proceeds to step 68.

If so, at step 74 the landing gear deployment controller 48 is configured to command the aircraft flight control system 40 to execute a landing abort sequence.

Thus, if the landing gears do not all down-lock by a pre-determined down-lock time, which can be the time used to compute the 'extend' threshold, the controller 48 will initiate an automated go-around with the flight control computer. Depending on the aircraft, this could be a simple interface to a 'go-around' function which exists already. Alternatively the controller could manage the auto-throttle command (commanding TOGA—take-off and go-around power) and direct the aircraft flight control system to abort the landing. If the down-lock signals are received within before the acceptable down-lock time window has expired, the controller 48 takes no further action until it is reset.

In preferred embodiments, the controller 48 is configured to output commands to the flight control system 40 to adjust the aircraft trim during the landing gear deployment using a pre-computed adjustment routine established based on system behaviour. Typically, landing gear do not have a continuously variable sensor to measure the retracted/extended position. An adjustment routine for a particular aircraft configuration can for example be determined by aerodynamic modelling and validated by flight testing. As such, using modelled and tested data, a pre-computed set of instructions on aircraft trim can be sent to the flight control system 40 based on time elapsed following the deploy command. For instance, if the landing gear deploys in 3 seconds and first 80% of its deployment occurs in the first second and the remaining 20% occurs in the last 2 seconds, then the controller can send the appropriate trim adjustment commands for that deployment characteristic. Alternatively, a sensor can be provided to measure the deployment position of the landing gear and send trim commands based on the actual position.

In other embodiments, controller 48 can provide an indication of the change of state which can be acted upon by the flight control system 40, rather than providing an adjustment routine.

Figure 5:
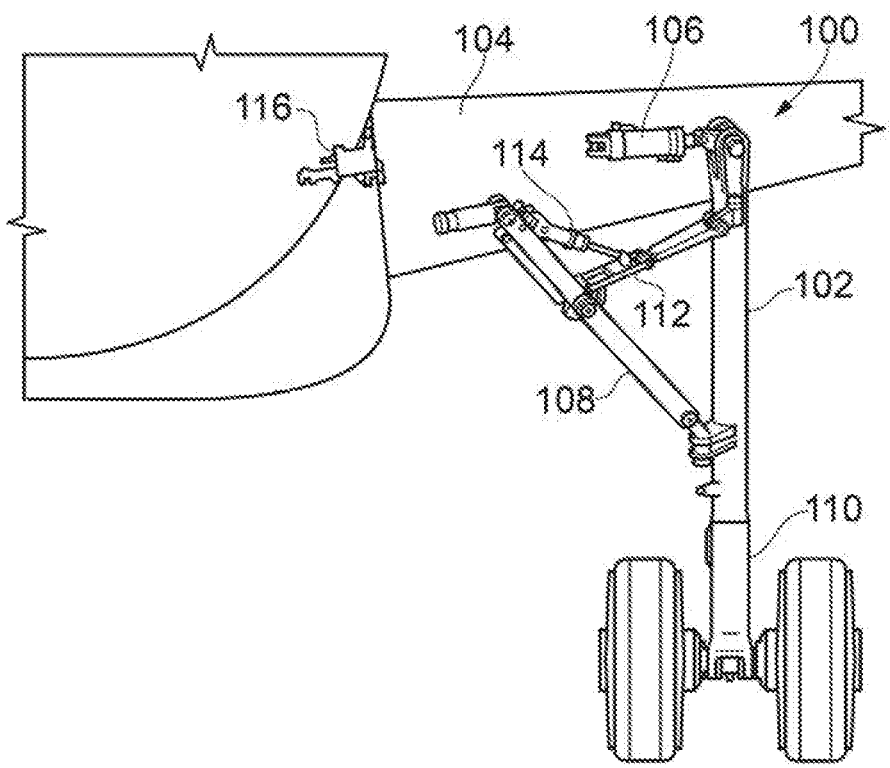
FIGS. 5 to 9 are examples of landing gear that can be used with the aircraft assembly of FIG. 3.

An aircraft assembly according to embodiments of the invention can enable an aircraft to adopt new flight paths to reduce fuel burn. Rather than a 'drive and dive' approach comprising climb, powered cruise to destination, then high descent rate into airport, a climb and glide approach could be used comprising climb, then reduced power glide to destination, without fear of increasing the noise level in outer zones 16, 18 of FIGS. 1 and 2 as the aircraft approaches. An aircraft assembly according to embodiments of the invention also permits the aircraft to maintain a clean aerodynamic profile for longer, thereby reducing fuel consumption Embodiments of the invention can comprise conventional landing gear. Referring to FIG. 5, a conventional aircraft landing gear assembly is shown generally at 100. The aircraft landing gear assembly 100 is movable between a deployed condition, as illustrated in FIG. 1, for take-off and landing, and a stowed condition (not shown) for flight.

A main strut 102 is pivotally coupled, at a top end, to the airframe 104 and at a bottom end carries a wheel and brake assembly 110, or other suitable ground contacting assembly.

A hydraulic or electromechanical retraction actuator 106 is coupled between the airframe 104 and the main strut 102 such that extension and retraction of the retraction actuator 106 results in movement of the main strut 102 between the deployed and stowed conditions. In addition to providing a motive force for retraction of the main strut 102, the retraction actuator 106 and also provides extension damping.

A brace or stay 108 is generally provided to support the orientation of the main strut 102 when the landing gear is in the deployed condition. The stay 108 is a two bar linkage that can be unfolded to assume a generally aligned, over centre condition in which the stay 108 is locked to inhibit movement of the main strut 102. When the stay 108 is broken, it no longer reacts movement of the main strut 102 and the main strut 102 can be moved by the retraction actuator 106 to the stowed condition.

A lock link 112 is generally provided in conjunction with each stay 108 to maintain the stay 108 in the locked condition. A lock link 112 generally includes a two bar linkage that can be unfolded to assume a locked over centre condition to inhibit movement of the stay 108. The lock link 112 must be broken by a lock-stay actuator 114 to enable the stay 108 to be folded, thereby permitting the main strut 102 to be moved by the retraction actuator 106 towards the stowed condition.

An up-lock 116 retains the landing gear in the stowed condition and can be controlled by the landing gear control system 22 to release the gear 100.

In order to improve the landing gear readiness after extension, it is preferred to use a separated shock absorbing strut, where the oil and gas are kept separate by a 'floating piston'. This avoids oil and gas mixing and so the landing gear will be ready to accept landing loads as soon as it is down-locked. Unseparated shock absorbers typically require some time, such as between 30 seconds and 180 seconds, for the oil to percolate down through the orifices and be completely ready for landing.

Figure 6:
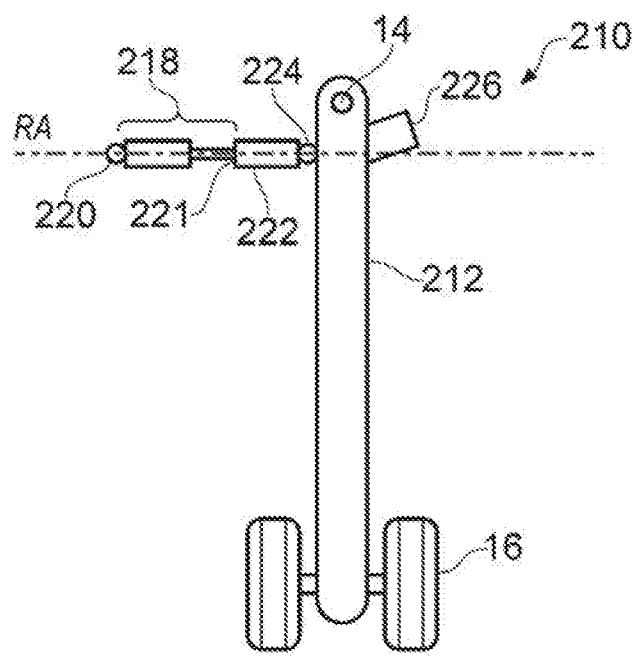

Referring now to FIG. 6, although embodiments of the invention can comprise conventional landing gear, it is preferred that landing gear are provided which are capable of rapid deployment. The illustrated landing gear assembly 210 is arranged to be routinely deployed by way of gravity. This can result in a relatively fast deployment of the landing gear assembly 210, which enables the landing gear assembly to be deployed later in the landing approach, thereby reducing the duration of aero-acoustic noise associated with the landing approach. Moreover, the landing gear assembly 210 can be deployed in a more reliable manner than some conventional landing gear assemblies.

A retraction actuator 218 is pivotally coupled at one end to the airframe via a pivot joint 220. The opposite end of the retraction actuator 218 is coupled to the main strut 212 indirectly via a retraction linkage 222, which is distinct from and coupled in series with the retraction actuator 218. The retraction linkage 222 is coupled to the retraction actuator 218 via a first joint 221 and pivotally coupled to the main strut 212 via a second joint 224.

A locking device (not shown) is operable to change the retraction linkage 222 between a locking condition and an extensible condition.

When in the locking condition, the retraction linkage 222 inhibits relative movement, in this case separation, between the first joint 221 and second joint 224 along a linkage axis RA that intersects and moves with the first 221 and second joints 224 such that the retraction actuator 218 can apply a stowing force to the main strut 212 through the retraction linkage 222 to move the main strut 212 from the deployed condition to the stowed condition.

When in the extensible condition, the retraction linkage 222 permits separation between the first joint 221 and the second joint 224 such that the main strut 212 can be deployed by way of gravity. However, the retraction linkage 222 remains coupled to the first joint 221 and the second joint 224 as the landing gear deploys to simplify retraction.

A damping device or dashpot 226 which is distinct from the retraction actuator 218 is provided to oppose and damp movement of the main strut 212 as it approaches the deployed condition. The landing gear can therefore freefall into lock with the final portion of its extension being damped by the specific damper 226. The damper 226 is shown as being attached between the main strut 212 and the aircraft, but can be attachable elsewhere, potentially employing a lost motion device. In some embodiments the damping device can be formed as part of the retraction linkage 222.

Figure 7A:
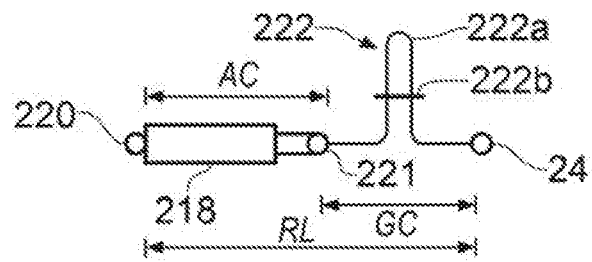
Figure 7B:
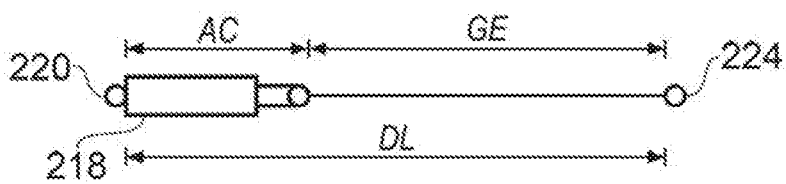
Figure 7C:
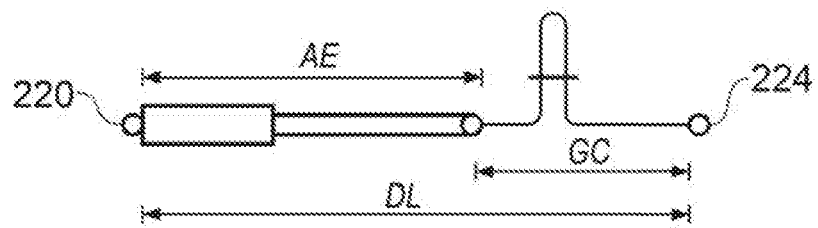

FIGS. 7a to 7c illustrate one example of how the retraction linkage 222 and locking device can be implemented.

In this example, the retraction linkage 222 includes a flexible member 222a of fixed length, such as a steel cord or wire, that can be manipulated by an actuator (not shown) to a relatively contracted state GC between the first and second joints 221, 224 as shown in FIG. 3a and locked in that condition by a suitable locking device 222b such as a clamp or the like. With the retraction actuator 218 in a relatively contracted state AC, the distance between the retraction assembly coupling points 220, 224 is a retracted length RL in which the main strut 212 is in the stowed condition.

When it is desired to deploy the landing gear assembly 210, the locking device 222b is operated to release the flexible member 222a such that the flexible member 222a of the retraction linkage 222 can assume a relatively extended state GE, as shown in FIG. 7b. Even with the retraction actuator 218 remaining in the relatively contracted state AC, the distance between the retraction assembly coupling points 220, 224 is now a deployed length DL in which the main strut 212 is in the deployed condition.

The retraction actuator 218 can be operated to assume a relatively extended state AE, as shown in FIG. 7c, enabling the flexible member 222 to be manipulated by the actuator (not shown) to the relatively contracted state GC and locked in that condition by the locking device 222b.

Thereafter, the retraction actuator 218 can be operated to assume the relatively contracted state AC in order to retract the main strut 212 via the contracted retraction linkage 222.

Figure 8A:
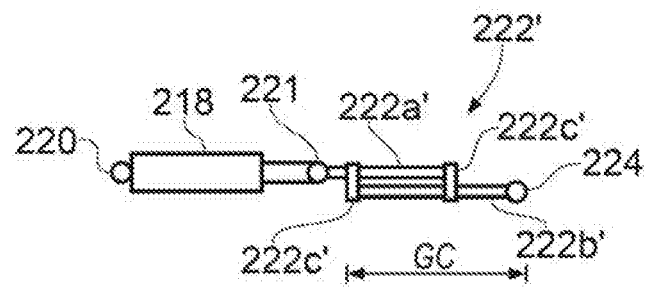
Figure 8B:
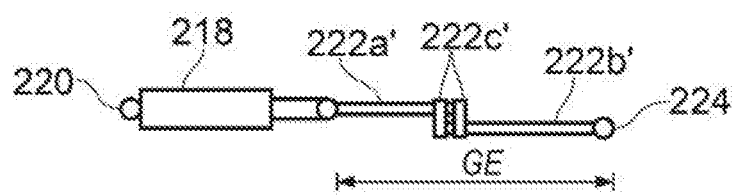

FIGS. 8a and 8b illustrate another example of how the retraction linkage can be implemented. In this example, the retraction linkage 222' includes a pair of elongate guide members 222a', 222b' movably coupled to one another via connectors 222c' so as to be movable relative to one another in an axial manner between a relatively contracted state GC, as shown in FIG. 8a, and a relatively extended state GE, as shown in FIG. 8b. The connectors 222c' can include a locking device such as a damp for locking the position of the members 222a', 222b' relative to one another. Functionally, the retraction linkage 222' works in an analogous manner to the retraction linkage 222 of FIGS. 7a to 7c. The guide members can be formed from any suitable material; for example, a metal such as steel, aluminium or titanium.

Figure 8C:
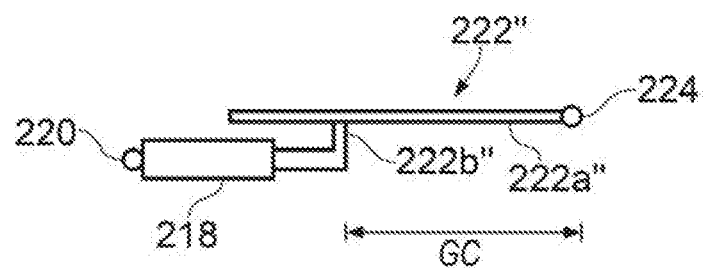
Figure 8D:
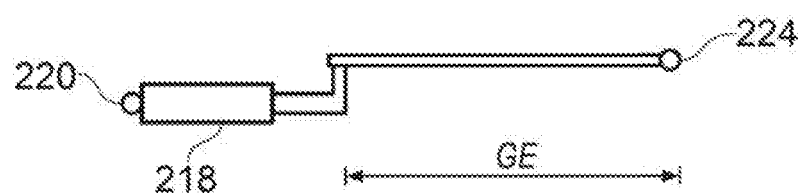

8c and 8d illustrate another example of how the retraction linkage can be implemented. In this example, the retraction linkage 222" includes a single elongate guide member 222a" pivotally coupled at one end to the main strut (not shown) via coupling 224. The other end of the guide member 222a" is free. The actuator 218 is movably coupled to the guide member 222a" via a runner 222b" such that the runner 222b" can slide or translate along a channel formed in the guide member 222a" in an axial manner between a relatively contracted state GC, as shown in FIG. 8c, and a relatively extended state GE, as shown in FIG. 8d. The runner 222b"

can include a locking device such as a damp for locking the position of the runner 222b" relative to guide member 222a". Functionally, the retraction linkage 222" works in an analogous manner to the retraction linkage 222 of FIGS. 7a to 7c, with the runner 222b" equating to the first joint 221.

Figure 9:
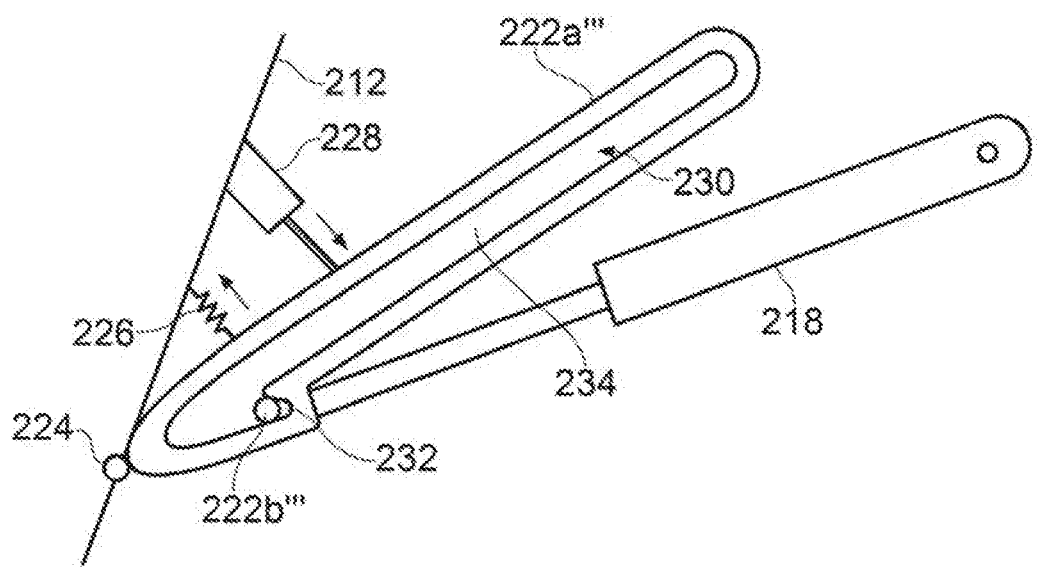

As illustrated in FIG. 9, in another example, which is similar to that shown in FIGS. 8c and 8d, the guide member 222a''' can include a channel 230 defining a guide within which a runner 222b''' provided at an end region of the retraction actuator 218 is movably confined. The channel 230 includes an extension portion 234 which is generally linear such that the runner 222b''' can move forwards and backwards along it unhindered. The end of the channel 230 which is closest to the strut 212 includes a hook portion 232 arranged such that, with the guide member 222a''' in a first orientation as shown in FIG. 9, which corresponds to a locking orientation, the runner 222b''' falls into the hook portion 232 by way of gravity upon the 218 retraction actuator assuming a particular extension state.

The hook portion 232 is shaped to retain the runner 222b''' such that during subsequent retraction, the actuator 218 pulls on the hook formation and therefore the guide member 222a''', thereby using it to retract the landing gear assembly. The hook portion 232 can be made of a strong material such as steel or CRES, whereas the extension portion 234 can be made from a thermoplastic or composite material as its function is not to take significant loads.

The guide member 222a''' is pivotally coupled to the main strut 212 at pivot 224 and biased by a spring or the like 226 to the first orientation in which the runner 222b''' remains within the hook portion of the channel due to gravity and the configuration of the hook portion 232.

In order to deploy the landing gear assembly, a release actuator 228 is energised by the landing gear control system 22 to change the orientation of the guide member 222a''' so that the runner 222b''' moves out of the hook portion 232 and is thereafter free to ride along the extension portion 234 of the guide channel 230. A guide channel advantageously enables the runner 222''' to be automatically guided back to a locking location, such as the hook portion 232, upon extension of the retraction actuator 218, ready for landing gear retraction following take off.

Although the landing gears described with reference to FIGS. 6 to 9 include a retraction linkage that is relatively short when the landing gear is stowed and relatively long when the gear is deployed, such that the retraction actuator pulls the gear towards the stowed condition with the linkage in tension, in other embodiments the opposite arrangement can be implemented where the retraction linkage that is relatively long when the landing gear is stowed and relatively short when the gear is deployed, such that the retraction actuator pushes the gear towards the stowed condition with the linkage in compression.

In other examples the retraction actuator can be coupled to the main strut and the retraction linkage coupled to the aircraft.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements, or by one or more suitably programmed computing devices. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft assembly comprising:
one or more landing gear each arranged to be movable between a stowed condition for flight and a deployed condition for take-off and landing, the landing gear having a known deployment value;
landing gear deployment apparatus for permitting the landing gear to move from the stowed condition to the deployed condition;
landing gear down-lock sensing apparatus for detecting that the landing gear has assumed the deployed condition and providing a down-lock signal indicative of the landing gear having assumed the deployed condition;
an aircraft navigation system for providing aircraft position relative to a target runway and aircraft speed information;
an aircraft landing gear control system for providing a deploy signal to the landing gear deployment apparatus to deploy the landing gear and receiving the down lock signals from the landing gear sensing apparatus;
an aircraft flight control system; and
a landing gear deployment controller communicatively coupled to the aircraft navigation system, the aircraft landing gear control system and the aircraft flight control system, the landing gear deployment controller being configured to:
calculate a touch down value using the aircraft position and speed information provided by the aircraft navigation system;
command the aircraft landing gear control system to provide the deploy signal when the touch down value reaches a deployment threshold which is greater than the known deployment value; and
command the aircraft flight control system to execute a landing abort sequence if the controller does not receive the down-lock signal from the landing gear sensing apparatus before expiry of a down-lock value which is greater than or equal to the known deployment value but less than the touch down value.

2. The aircraft assembly of claim 1, wherein the landing gear deployment controller is communicatively coupled to an aircraft flight deck interface system for enabling the landing gear deployment controller to be controlled from the aircraft flight deck.

3. The aircraft assembly of claim 1, wherein the deployment threshold value is less than or equal to ten times the known deployment time for the landing gear.

4. The aircraft assembly of claim 1, wherein the landing gear deployment controller is configured to output commands to the flight control system to adjust the aircraft trim during the landing gear deployment using a pre-computed adjustment routine established based on system behaviour.

5. The aircraft assembly of claim 1, wherein the known deployment value is a deployment time, the touch down value is a touch down time, the deployment threshold value is a deployment threshold time and the down-lock value is a down-lock time.

6. The aircraft assembly of claim 1, wherein the landing gear comprises:
- a main strut having a first end region arranged to be movably coupled to an aircraft such that the main strut can be moved between a deployed condition, for take-off and landing, and a stowed condition for flight;
- a damping device arranged to oppose movement of the main strut as it approaches the deployed condition;
- a retraction actuator arranged to be coupled to one of the main strut and the aircraft;
- a mechanical retraction linkage coupled to the retraction actuator via a first joint and coupled to a second one of the main strut and the aircraft via a second joint; and
- a locking device operable to change the retraction linkage between:
  - a locking condition in which the retraction linkage inhibits relative movement between the first joint and second joint in at least one direction along a linkage axis intersecting the first and second joints such that the retraction actuator can apply a stowing force to the main strut through the retraction linkage to move the main strut from the deployed condition to the stowed condition; and
  - an extensible condition in which the retraction linkage permits relative movement between the first joint and the second joint independently of the extension state of the retraction actuator while remaining coupled to the first joint and the second joint such that the main strut can be deployed by way of gravity.

7. The aircraft assembly of claim 1, wherein the known deployment value is a deployment time value and/or the touch down value is a touch down time value.

8. The aircraft assembly of claim 1, wherein the known deployment value is a deployment distance value representing the distance that the aircraft assembly will travel before the landing gear is fully deployed and/or the touch down value is a touch down distance value representing the distance that the aircraft assembly will travel before the touch down.

9. A method of automatically deploying a landing gear from an aircraft, the method comprising:
- calculating a touch down value indicative of the value until the aircraft touches down a runway using aircraft position and speed information provided by an aircraft navigation system;
- automatically deploying the landing gear when the touch down value reaches a deployment threshold value which is greater than a known deployment value for the landing gear; and
- commanding a flight control system of the aircraft to execute a landing abort sequence if a landing gear down-lock signal is not received within a down-lock value which is greater than or equal to the known deployment value for the landing gear but less than the touch down value.

10. The method according to claim 9, further comprising a step of adjusting the aircraft trim during landing gear deployment using a pre-computed adjustment routine established based on system behaviour.

11. The method according to claim 9, whereby the deployment threshold value is less than or equal to ten times the known deployment value for the landing gear.

12. The method according to claim 9, whereby the known deployment value for the landing gear is a deployment time, the touch down value is a touch down time, the deployment threshold value is a deployment threshold time and the down-lock value is a down-lock time.

* * * * *